United States Patent
Matsuda et al.

(10) Patent No.: US 7,106,012 B2
(45) Date of Patent: Sep. 12, 2006

(54) ELECTRONIC CONTROL UNIT, ELECTRIC POWER-ASSISTED STEERING DEVICE AND TRANSMISSION RATIO-VARIABLE STEERING UNIT

(75) Inventors: Naoki Matsuda, Handa (JP); Yasuyoshi Toda, Toyohashi (JP); Toshihisa Yamamoto, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/134,142

(22) Filed: May 20, 2005

(65) Prior Publication Data

US 2005/0258792 A1 Nov. 24, 2005

(30) Foreign Application Priority Data

May 21, 2004 (JP) ............................. 2004-152411

(51) Int. Cl.
H02P 4/00 (2006.01)

(52) U.S. Cl. ....................... 318/139; 318/139; 318/459; 318/479; 318/635; 318/650; 318/808; 318/812; 180/443; 180/444; 180/446; 361/23

(58) Field of Classification Search ................ 318/139, 318/459, 635, 479, 650, 808, 812
See application file for complete search history.

(56) References Cited

U.S. PATENT DOCUMENTS

| 4,353,023 | A | * | 10/1982 | Kawada et al. ............. 318/762 |
| 4,434,393 | A | * | 2/1984 | Kobari et al. ............... 318/757 |
| 4,538,100 | A | * | 8/1985 | Tuten et al. ................ 318/808 |
| 4,670,827 | A | * | 6/1987 | Schneider .................... 363/48 |
| 4,697,131 | A | * | 9/1987 | Schauder et al. ........... 318/762 |
| 4,801,859 | A | * | 1/1989 | Dishner ....................... 323/224 |
| 4,959,602 | A | * | 9/1990 | Scott et al. ................. 318/803 |
| 5,208,518 | A | * | 5/1993 | Grapenthin et al. ........ 318/138 |
| 5,375,429 | A | * | 12/1994 | Tokizaki et al. ........... 62/235.1 |
| 5,471,125 | A | * | 11/1995 | Wu ............................. 318/803 |
| 5,744,943 | A | * | 4/1998 | Tokai ........................ 323/282 |
| 5,949,275 | A | * | 9/1999 | Moller et al. ............... 327/536 |
| 6,060,859 | A | * | 5/2000 | Jonokuchi .................... 318/801 |
| 6,181,583 | B1 | * | 1/2001 | Okui et al. .................... 363/45 |
| 6,217,478 | B1 | * | 4/2001 | Vohmann et al. ............. 477/50 |
| 6,219,604 | B1 | * | 4/2001 | Dilger et al. ................. 701/41 |
| 6,331,365 | B1 | * | 12/2001 | King ............................. 429/9 |
| 6,367,577 | B1 | * | 4/2002 | Murata et al. .............. 180/446 |
| 6,567,283 | B1 | * | 5/2003 | Welches ....................... 363/89 |
| 6,597,134 | B1 | * | 7/2003 | Brenden et al. ............ 318/254 |
| 6,731,023 | B1 | * | 5/2004 | Rothleitner et al. .......... 307/64 |
| 6,737,822 | B1 | * | 5/2004 | King ........................... 318/375 |
| 6,775,115 | B1 | * | 8/2004 | Sato ............................ 361/23 |

(Continued)

FOREIGN PATENT DOCUMENTS

JP 2003-123495 4/2003

*Primary Examiner*—Rina Duda
*Assistant Examiner*—Robert W. Horn
(74) *Attorney, Agent, or Firm*—Harness, Dickey & Pierce, PLC

(57) ABSTRACT

An electronic control unit for producing a sufficiently boosted voltage even when a supply voltage becomes high includes an inverter that drives switching elements and converts a DC voltage into an AC voltage, and booster means which boosts a DC voltage that is input into a voltage to lie within a voltage range in which a voltage necessary for driving the switching elements is a lower-limit value and a maximum boosted voltage is an upper-limit value, and outputs the boosted voltage to the inverter.

7 Claims, 13 Drawing Sheets

U.S. PATENT DOCUMENTS

| | | |
|---|---|---|
| 6,777,898 B1 * | 8/2004 | Peterson .................... 318/139 |
| 6,795,756 B1 * | 9/2004 | Zhang et al. ................. 701/22 |
| 6,826,455 B1 * | 11/2004 | Iott et al. .................... 700/297 |
| 6,841,954 B1 * | 1/2005 | Nakabayashi ................ 318/62 |
| 6,854,813 B1 * | 2/2005 | Yokoyama et al. .... 303/122.04 |
| 6,863,150 B1 * | 3/2005 | Tanaka et al. .............. 180/446 |
| 6,868,933 B1 * | 3/2005 | Kameya ..................... 180/404 |
| 6,879,502 B1 * | 4/2005 | Yoshida et al. .............. 363/60 |
| 6,885,225 B1 * | 4/2005 | Ohmichi et al. ............ 327/112 |
| 6,909,201 B1 * | 6/2005 | Murty et al. ............... 307/10.1 |
| 6,952,085 B1 * | 10/2005 | Nerone ................. 315/209 R |
| 6,987,371 B1 * | 1/2006 | Kifuku ....................... 318/432 |
| 2004/0040535 A1 * | 3/2004 | Miwa et al. ................ 123/305 |
| 2004/0051421 A1 * | 3/2004 | Montuschi et al. ......... 310/317 |
| 2004/0129490 A1 * | 7/2004 | Kodama et al. ............ 180/402 |
| 2004/0148075 A1 * | 7/2004 | Bullister et al. .............. 701/41 |
| 2004/0222035 A1 * | 11/2004 | Yoneda et al. .............. 180/443 |
| 2005/0038585 A1 * | 2/2005 | Asaumi et al. ............... 701/43 |
| 2005/0092541 A1 * | 5/2005 | Kifuku ....................... 180/443 |
| 2005/0231184 A1 * | 10/2005 | Kawaguchi et al. ........ 323/312 |
| 2006/0028778 A1 * | 2/2006 | O'Gorman et al. ........... 361/62 |
| 2006/0043938 A1 * | 3/2006 | O'Gorman et al. ............ 322/8 |

\* cited by examiner

ELECTRONIC CONTROL UNIT, ELECTRIC POWER-ASSISTED STEERING DEVICE AND TRANSMISSION RATIO-VARIABLE STEERING UNIT

CROSS REFERENCE TO RELATED APPLICATIONS

This application is based upon, claims the benefit of priority of, and incorporates by reference the contents of, Japanese Patent Application No. 2004-152411 filed on May 21, 2004.

FIELD OF THE INVENTION

This invention relates to an electronic control unit and, particularly, to an electronic control unit which includes an electric power-assisted steering device and a transmission ratio-variable steering unit and controls an inverter.

BACKGROUND OF THE INVENTION

An electronic control unit (hereinafter often referred to as ECU) requires various power source voltages depending upon the applications. Particularly, when a motor is to be driven by a known H-bridge or a three-phase bridge constituted by switching elements, there is usually used a method of boosting a power source voltage supplied to the ECU through a booster circuit as a gate drive source for the MOSFETs (metal oxide semiconductor field-effect transistors) which are the switching elements.

The booster circuit boosts the supplied voltage to be roughly twice as great or more. There, however, exists an upper limit in the voltage (i.e., breakdown voltage) applied to the parts and elements constituting the booster circuit and the electric circuit such as the H-bridge or the three-phase bridge, and voltages in excess of the upper limit shall not be applied thereto. When a high voltage is supplied to the booster circuit, the voltage is further boosted and often exceeds the breakdown voltage causing the circuit to be broken down. So far, therefore, a monitoring function has been provided to monitor the supplied voltage, and the operation of the booster circuit is discontinued in case the supplied voltage exceeds a predetermined value.

There have further been devised a semiconductor memory device which measures the time until the supplied voltage is boosted to a predetermined voltage and operates the booster circuit for the measured period of time only, and a circuit for forming the boosted voltage for the semiconductor memory device (see JP-A-2003-123495).

In many cases, however, it has been demanded to obtain a predetermined boosted voltage despite an increase in the supplied voltage as a result of fluctuation. In an electric power-assisted steering device of a vehicle, for example, an alternator generates an overvoltage at the time of load dumping (in case a battery terminal is disconnected). Therefore, the power source voltage (voltage supplied from the battery) rises abruptly. In case the supplied voltage exceeds a predetermined value in the prior art, the operation of the booster circuit is discontinued to protect the circuit. Therefore, no voltage for driving is supplied to the switching elements of the inverter. When the supplied voltage becomes lower than the predetermined value, the booster circuit is driven again. While the booster circuit is not in operation, therefore, the motor is not driven by the inverter which is for assisting the steering force; i.e., a problem arouses in that the steer-assisting force abruptly decreases and the feeling of steering is deteriorated.

The boosted voltage necessarily decreases when the booster circuit is no longer operated. However, the supplied voltage is an overvoltage generated by the alternator and does not decrease despite the booster circuit no longer being operated. Therefore, the ECU cannot monitor the supplied voltage to control the operation of the booster circuit so as not to interrupt the operation of the electric motor. This holds not only at the time of load dumping but also in the case of the ECU to which a high voltage is supplied at all times from the battery (e.g., when the battery voltage is 42 V).

SUMMARY OF THE INVENTION

In view of the above problems, it is an object of the present invention to provide an electronic control unit which produces a sufficiently boosted voltage even when the supplied voltage becomes high, an electric power-assisted steering device, and a transmission ratio-variable steering unit.

This invention provides an electronic control unit, an electric power-assisted steering device and a transmission ratio-variable steering unit for solving the above problems. That is, according to a first aspect of the invention, there is provided an electronic control unit comprising:

an inverter that drives the switching elements and converts a DC voltage into an AC voltage; and booster means which boosts a DC voltage that is input into a voltage to lie within a voltage range in which a voltage necessary for driving the switching elements is a lower-limit value and a maximum boosted voltage is an upper-limit value, and outputs the boosted voltage to the inverter.

FIG. 10 is a diagram illustrating a relationship between the supplied voltage and the boosted voltage. The boosted voltage (straight line 62) must be greater than a value (straight line 61) which is the sum of the battery voltage and a voltage Vgs (voltage across the gate and the source of MOSFET) for driving the switching elements 301 to 303 in a motor drive circuit shown in, for example, FIG. 3. Therefore, the lower-limit value of the supplied voltage necessary for the boosting becomes V1. In the prior art, the upper-limit value of the supplied voltage is V2 with which the boosted voltage becomes the same as, or is slightly lower than, a breakdown voltage Vth2 of the circuit or of the parts. Therefore, the boosting is not effected if the supplied voltage exceeds V2. In the present invention, on the other hand, in case the supplied voltage exceeds V2, the operation of the booster circuit is not readily stopped but, instead, booster means is driven and stopped at any time depending upon the state in which the voltage is boosted. This constitution makes it possible to produce the boosted voltage until the supplied voltage reaches V3. That is, the power source voltage can be selected over a wide range, and an electronic control unit can be shared among a plurality of systems having different power source voltages. Therefore, the electronic control unit can be produced at a decreased unit price owing to the effect of mass production. Further, since the boosted voltage does not exceed the breakdown voltage Vth2, the circuits or the parts are prevented from being broken down. Therefore, the circuits and the parts can be realized in small sizes to suppress the cost of production.

According to a second aspect of the invention, the electronic control unit of the invention includes voltage monitoring means for monitoring a voltage value that is boosted, and the booster means discontinues the boosting when the monitored voltage becomes greater than a predetermined threshold value included in the voltage range, and effects the boosting when the monitored voltage becomes smaller than the threshold voltage. In this constitution, the boosted voltage is monitored, and the boosting circuit is driven and stopped at any time depending upon the monitored result to control the boosted voltage. This makes it possible to obtain a sufficiently highly boosted voltage that could not be obtained so far even when the supplied voltage is high, yet preventing the circuitry from being broken down that results when the breakdown voltages are exceeded. Besides, the boosted voltage is stabilized at a value which is the same as, or slightly lower than, the breakdown voltage Vth2 of the circuit or of the parts eliminating the need of halting the operation of the circuit or the actuator to which the boosted voltage is to be supplied. This improves the stability and reliability of the system as a whole inclusive of the electronic control unit.

According to a third aspect of the invention, the electronic control unit of the invention is constituted as an electric power-assisted steering device in a vehicle in which a motor is energized and driven based on the steering operation by a driver to give a steer-assisting torque to a steering mechanism, wherein the motor is driven by the inverter. This constitution makes it possible to supply, at all times, a voltage (boosted voltage) necessary for driving the switching elements of the inverter in the electric power-assisted steering device, enabling the required steer-assisting torque to be produced at all times without halting the operation of the switching elements and without deteriorating the feeling of steering.

According to a fourth aspect of the invention, the electronic control unit of the invention is constituted as a transmission ratio-variable steering unit comprising an input shaft connected to the steering side, an output shaft connected to the side of the wheels to be steered, and a transmission ratio-variable mechanical unit which varies the rotational angle of the output shaft relative to the rotational angle of the input shaft by energizing and driving a motor, wherein the motor is driven by the inverter. This constitution makes it possible to supply, at all times, a voltage (boosted voltage) necessary for driving the switching elements of the inverter in the transmission ratio-variable steering unit, enabling the transmission ratio-variable mechanical unit to be in operation at all times without halting the operation of the switching elements and without deteriorating the feeling of steering.

DETAILED DESCRIPTION OF THE INVENTION

The object of boosting the voltage to a degree that is required and sufficient even when the supplied voltage becomes high, is realized by using an electronic control unit that changes over the drive and stop of the booster circuit relying upon a value of the boosted voltage, by using an electric power-assisted steering device and by using a transmission ratio-variable steering unit.

Embodiments of the electronic control unit, electric power-assisted steering device and transmission ratio-variable steering unit of the invention will now be described with reference to the drawings.

Figure 1:
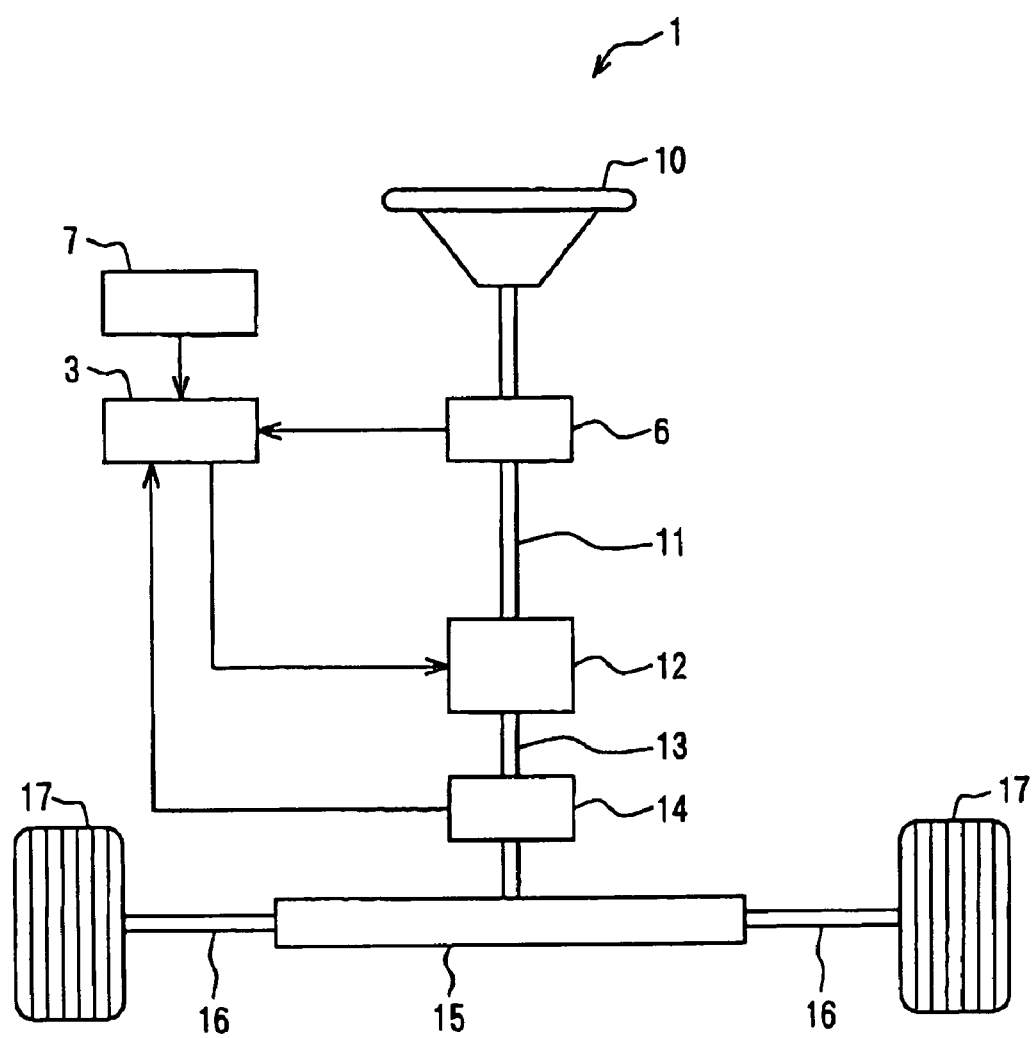
FIG. 1 is a diagram illustrating the whole constitution of a transmission ratio-variable control unit according to an embodiment of the invention.
Figure 2:
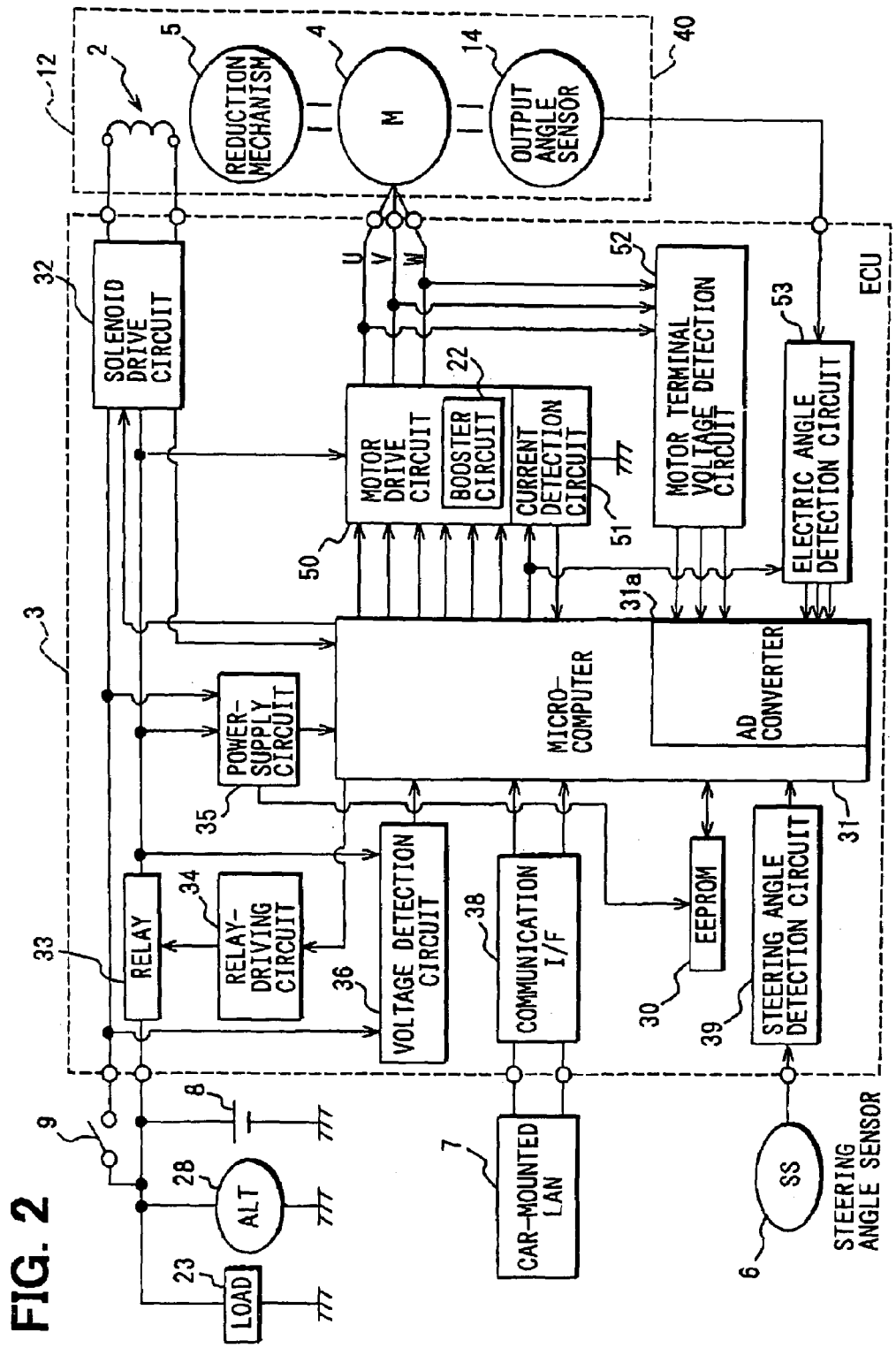
FIG. 2 is a diagram illustrating a transmission ratio control unit in detail.

FIG. 1 is a diagram of when the electronic control unit of the invention is applied to the transmission ratio-variable steering unit of a vehicle, and FIG. 2 is a block diagram illustrating the circuit constitution of the whole transmission ratio-variable steering unit 1. The electronic control unit of the invention can also be applied to those other than the transmission ratio-variable steering unit of a vehicle, and there is no limitation on the objects to which the invention can be applied.

Referring, first, to FIG. 1, a steering wheel 10 of a vehicle is connected to an upper end of an input shaft 11. The lower end of the input shaft 11 and the upper end of an output shaft 13 are connected together through a transmission ratio-variable unit 12. Further, a pinion that is not shown is provided at the lower end of the output shaft 13, and is in mesh with a rack 16 in a steering gear box 15. In the steering gear box 15, further, there is provided an electric power-assisted steering device that is not shown. To both ends of the rack 16, there are connected rolling wheels 17 to be steered via tie rods and arms that are not shown.

A steering angle sensor 6 is provided on the input shaft 11 to detect the steering angle of the steering wheel 10, while an output angle sensor 14 constituted by a resolver is provided on the output shaft 13 to detect the steered angle of the rolling wheels 17 to be steered, The output angle sensor 14 may be provided in the transmission ratio-variable unit 12. The steering angle of the input shaft 11 and the rotational angle of the output shaft 13 detected by the steering angle sensor 6 and the output angle sensor 14 are input to the transmission ratio control unit 3 which, further, receives a vehicle speed signal and an engine rotational speed signal from a car-mounted LAN (local area network) 7. The transmission ratio control unit 3 produces a control signal for controlling the transmission ratio-variable unit 12.

The transmission ratio-variable unit 12 includes a motor 4 which is a known brushless motor and a reduction mechanism 5, and varies the rotational angle of the output shaft 13 by turning the motor 4 which is the brushless motor relying upon the signals from the steering angle sensor 6 and from the car-mounted LAN 7.

In the steering mechanism described above, first, upon receiving a vehicle speed signal from the car-mounted LAN 7 and a steering angle detected by the steering angle sensor 6, the transmission ratio control unit 3 operates a target rotational angle of the output shaft 13 based on these data. A motor control instruction based on a target rotational angle is sent as a PWM signal (pulse width modulation signal) from the transmission ratio control unit 3 to the transmission ratio-variable unit 12. The motor 4 in the transmission ratio-variable unit 12 is driven by the motor control instruction, and the rolling wheels 17 to be steered are imparted with a steering angle corresponding to the rotational angle obtained by adding the target rotational angle of the output shaft 13 and the steering angle of the steering wheel 10 up together. The transmission ratio control unit 3 effects the operation by feedback to estimate the real steered angle of the rolling wheels 17 to be steered from the output angle sensor 14 and to impart, to the rolling wheels 17 to be steered, the steering angle which reliably corresponds to the target rotational angle.

Upon detecting the abnormal condition in the transmission ratio-variable unit 12, the transmission ratio control unit 3 sends an instruction to a solenoid drive circuit 32 to interrupt the supply of current to a solenoid coil 2. Therefore, the input shaft 11 and the output shaft 13 are coupled together to execute the operation without the transmission ratio-variable unit 12.

Next, the constitution for controlling the transmission ratio-variable steering unit 1 will be described with reference to FIG. 2. The solenoid coil 2 is connected to the solenoid drive circuit 32 of the transmission ratio control unit 3 that will be described later, and generates an electromagnetic force relying upon a drive signal from the solenoid drive circuit 32 to couple the input shaft 11 and the output shaft 13 together or to disconnect them from each other.

The transmission ratio control unit 3 controls the current that flows into the solenoid coil 2 and controls the drive of the motor 4 based on the steering angle data from the steering angle sensor 6 and the data such as the vehicle speed from the car-mounted LAN 7. The transmission ratio control unit 3 is constituted by a microcomputer 31, the solenoid drive circuit 32, a relay 33, a relay drive circuit 34, a power supply circuit 35, a voltage detection circuit 36, a communication I/P (interface) 38, a steering angle detection circuit 39, a motor drive circuit 50, a current detection circuit 51, a motor terminal voltage detection circuit 52, and an electric angle detection circuit 53.

The microcomputer 31 operates currents that flow into the solenoid coil 2 and the motor 4 based on the steering angle data from the steering angle sensor 6 and on the data such as vehicle speed from the car-mounted LAN 7, and outputs a control signal based on the operated value, and is constituted by a CPU, a ROM, a RAM, an input/output interface and a bus line for connecting them, which have been known but which are not shown here. Various operation processings based on the signals input to the microcomputer 31 and control signal output processings of the microcomputer 31 for the peripheral circuits, are executed by control programs stored in the ROM that are not shown.

The relay 33 is provided between the battery 8 and the power supply circuit 35 to make a connection or a break between the battery 8 and the power supply circuit 35 thereby to supply the electric power to, or interrupt the supply of electric power from, the transmission ratio-variable steering unit 1. The relay 33 is turned on or off by the relay drive circuit 34 which is operated by a control signal from the microcomputer 31.

The power supply circuit 35 is connected to the battery 8 via an IG switch 9, and a current is supplied from the battery 8 to the microcomputer 31. The voltage detection circuit 36 detects the voltage of the battery 8, and inputs the detected value to the microcomputer 31.

A booster circuit 22 is provided in the motor drive circuit 50, boosts the voltage fed from the battery 8 to a predetermined voltage and applies it to a MOSFET gate drive circuit 314 (see FIG. 3) included in the motor drive circuit 50.

The communication I/F 38 converts the vehicle speed signal from the car-mounted LAN 7 and the engine rotational speed signal into those signals that can be processed by the microcomputer 31, and inputs the thus converted vehicle speed signal and the engine rotational speed to the microcomputer 31. The communication I/F 38, further, receives a signal for forcibly varying the above target rotational angle from the car-mounted LAN 7 to suppress unstable behavior of the vehicle, and inputs this signal to the microcomputer 31. The signal for forcibly varying the target rotational angle is input to the communication I/F 38 in case, for example, the steering wheels 17 to be steered are skidded.

The steering angle detection circuit 39 converts the signal from the steering angle sensor 6 into a form that can be recognized by the microcomputer 31, and inputs the converted steering angle signal to the microcomputer 31.

Figure 3:
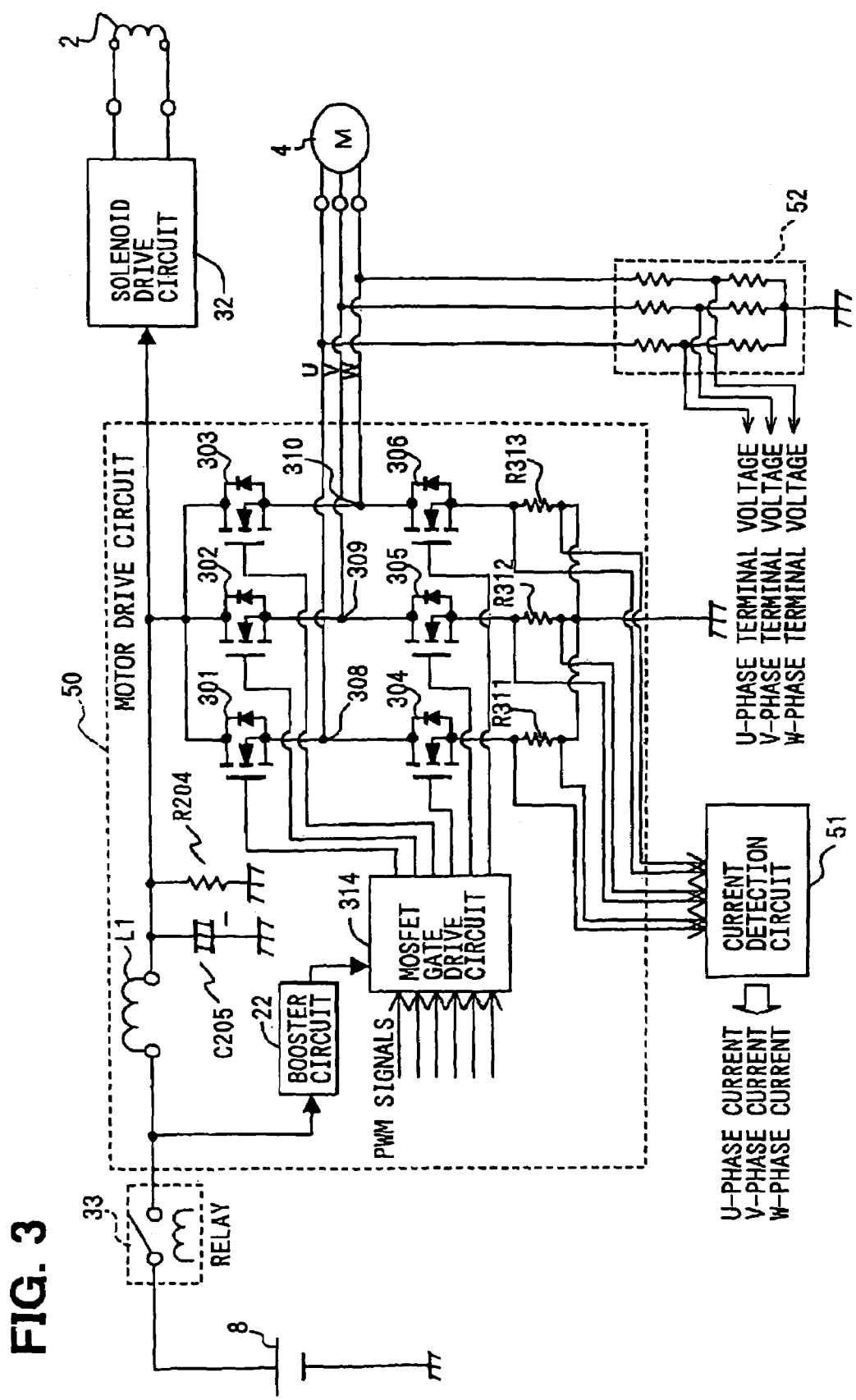
FIG. 3 is a diagram illustrating a motor drive circuit in detail.

The motor drive circuit 50 has six switching transistors 301 to 306 that constitute a known three-phase bridge circuit as shown in FIG. 3, and drives the motor 4 by controlling the six switching transistors by varying the PWM duty ratios based on the drive signals from the microcomputer 31.

The current detection circuit 51 detects the currents flowing into the U-phase, V-phase and W-phase of the motor 4, and inputs the detected current values to the AD converter 31a in the microcomputer 31. The motor terminal voltage detection circuit 52 detects terminal voltages of the U-phase, V-phase and W-phase of the motor 4, and inputs the detected voltages to the AD converter 31a in the microcomputer 31. In this embodiment, the AD converter 31a is incorporated in the microcomputer 31, which, however, may be provided outside the microcomputer 31.

The electric angle detection circuit 53 converts the rotational angle (electric angle) detected by the output angle sensor 14 connected to the reduction mechanism 5 through the output shaft 13 into a form that can be processed by the microcomputer 31, and inputs the thus converted rotational angle signal to the microcomputer 31.

As for the operation of the transmission ratio-variable steering unit 1, the microcomputer 31 outputs a control signal to the solenoid drive circuit 32 which permits a current to flow into the solenoid 2 to disconnect the input shaft 11 and the output shaft 13 from each other. The motor 4 is driven based on the signals from the steering angle sensor 6 and the car-mounted LAN 7, and the rotational force of the motor 4 is transmitted to the output shaft 13 through the reduction mechanism 5. The torque sensor in the electric power-assisted steering device (not shown) detects the torque which is obtained by adding together the torque of the output shaft 13 to which the rotational force of the motor 4 is transmitted and the steering force exerted by the driver, and the steered angle of the rolling wheels 17 to be steered is varied by the electric motor of the electric power-assisted steering device.

(Prior Technology)

Figure 8:
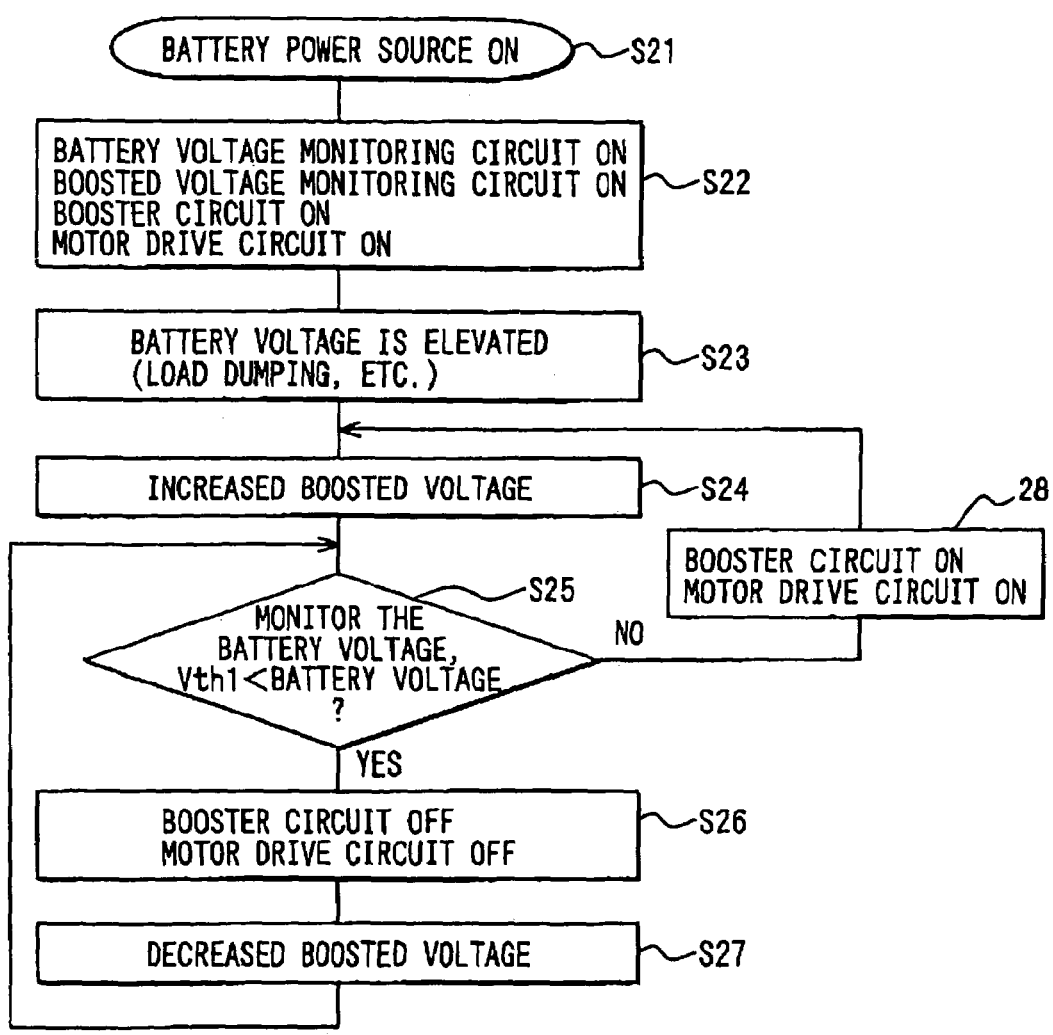
FIG. 8 is a flowchart illustrating the operation of a booster circuit according to a prior art.
Figure 9A:
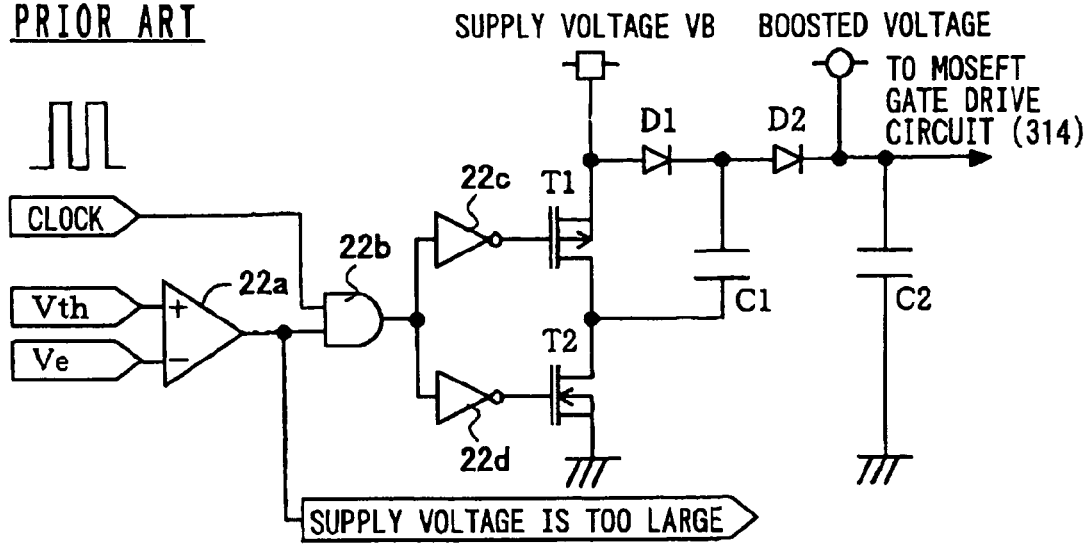
FIGS. 9A–9B are diagrams illustrating the booster circuit according to the prior art.
Figure 9B:
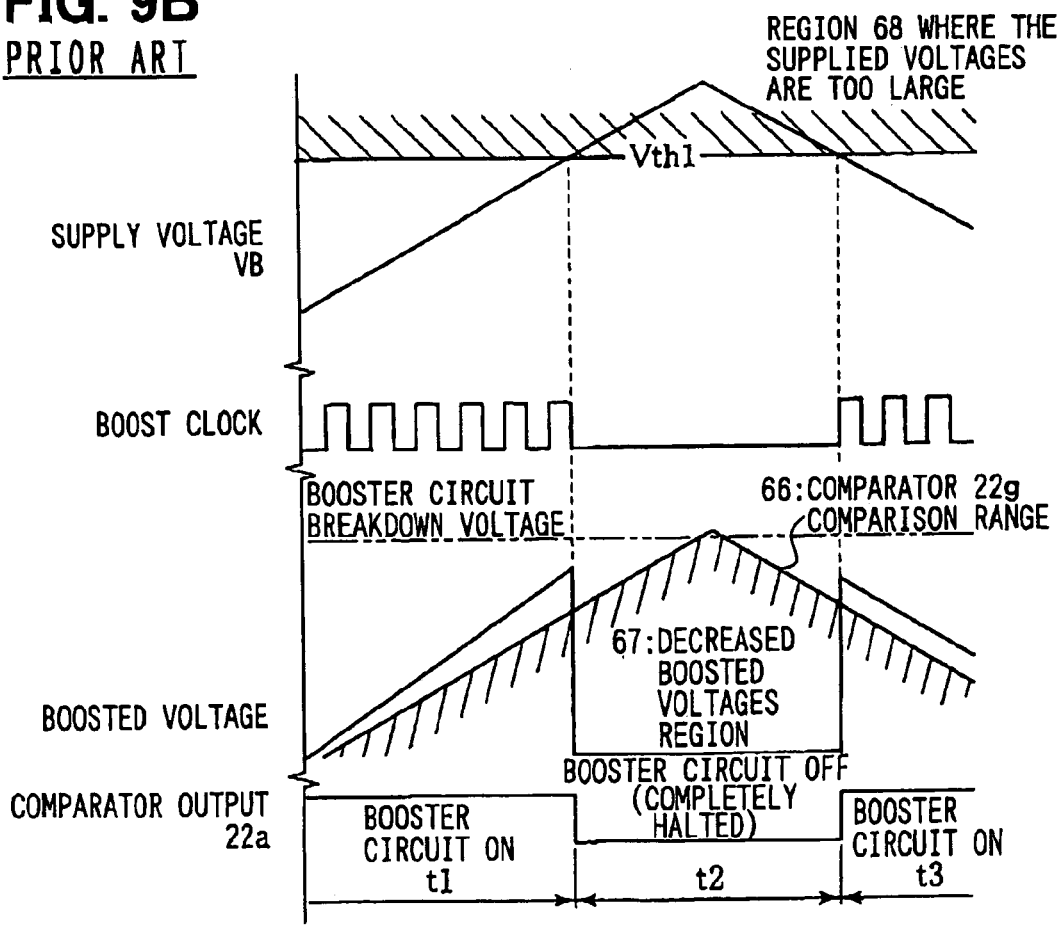
Figure 10:
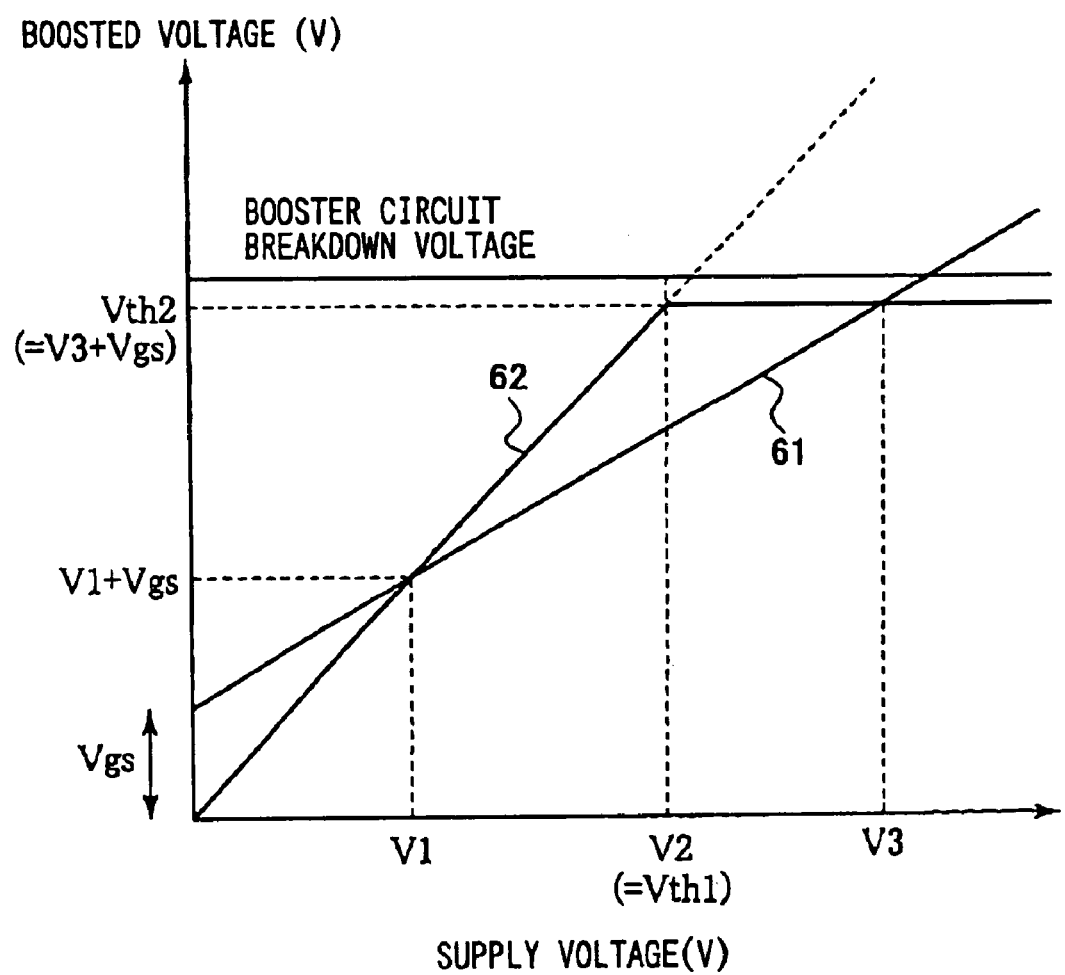
FIG. 10 is a diagram illustrating an effective range of boosting the voltage.

For easy comprehension of the constitution of the present invention, described below with reference to FIGS. 8 and 9A–9B is an example of controlling the booster circuit 22 according to a prior art. FIG. 8 is a flowchart illustrating the flow of control, and FIGS. 9A–9B are diagrams illustrating the booster circuit and a timing chart at the time when the booster circuit operates.

In FIG. 9A, a comparator 22a is a known operational amplifier to which a resistor and a capacitor that are not shown are connected to compare the voltages. To one input terminal of the comparator 22a, there is input a voltage Ve (see FIG. 13B) divided from the supply voltage VB of the battery 8 and to the other input terminal thereof, there is input a threshold value Vth for monitoring a high voltage of the supply voltage VB. The threshold value Vth may be formed in the booster circuit 22 based on the supply voltage VB, or may be formed by the power supply circuit 35 or by the microcomputer 31.

When the voltage Ve divided from the supply voltage VB of the battery 8 is smaller than the threshold value Vth, the comparator 22a outputs the H-level. When the voltage Ve divided from the supply voltage VB of the battery 8 is larger than the threshold value Vth, the comparator 22a outputs the L-level. The output from the comparator 22a is input to an AND circuit 22b constituted by a known logic circuit to AND with the clock signal and turn switching elements T1 and T2 on/off based on the results thereof. Therefore, the clock signal becomes effective only when the comparator 22a is producing the H-level, and the switching elements T1 and T2 are turned on/off. Reference numerals 22c and 22d denote buffer circuits that render the output from the AND circuit 22b to assume a voltage level necessary for turning the switching elements T1 and T2 on or off.

When the clock signal is of the L-level, the switching element T1 is turned off and the switching element T2 is turned on to establish a passage of battery 8 (supplied voltage VB)—diode D1 for preventing the reversal flow—capacitor C1—switching element T2—GND (ground), and an electric charge is accumulated in the capacitor C1 depending upon the supply voltage VB of the battery 8. When the clock signal is of the H-level, on the other hand, the switching element T1 is turned on and the switching element T2 is turned off to establish a passage of capacitor C1—diode D2 for preventing the reversal flow—capacitor C2, and the electric charge accumulated in the capacitor C1 is accumulated in the capacitor C2.

The capacitor C2 is applied with the supply voltage VB of the battery 8 at all times. Therefore, when the electric charge accumulated in the capacitor C1 is accumulated in the capacitor C2, an electric charge corresponding to 2×VB (V) is finally accumulated in the capacitor C2. The voltage becomes 2×VB (V) across the terminals of the capacitor C2; i.e., this voltage (boosted voltage) is applied to the MOSFET gate drive circuit 314.

A flow of the drive control for the booster circuit 22 will be described with reference to the flowchart of FIG. 8. When the relay 33 is turned on to supply the voltage VB from the battery 8 (S21), the booster circuit 22, the battery voltage monitoring circuit included in the booster circuit 22, the boosted voltage monitoring circuit included in the booster circuit 22, the motor drive circuit 50 and the MOSFET gate drive circuit 314 are operated (S22). Thereafter, as described earlier, an electric charge is accumulated in the capacitor C1 and in the capacitor C2, and the voltage of the battery 8 is boosted. If the supply voltage VB from the battery 8 rises in this state (S23), the boosted voltage (≈supply voltage VB of the battery 8×2) output from the booster circuit 22 is further increased (S24, corresponds to a region t1 in FIG. 9B).

The battery voltage monitoring circuit including the comparator 22a compares the voltage Ve divided from the battery voltage (supply voltage) VB with the threshold value Vth. When it is determined that the battery voltage is smaller than Vth1 (S25: NO), the booster circuit 22 and the motor drive circuit 50 continue to operate (S28). When it is determined that the battery voltage is greater than Vth1 (S25: YES), on the other hand, the switching element T1 is turned off and the switching element T2 is turned on to discontinue the operation of the booster circuit 22, and it is so determined that the supplied voltage VB is too large and an abnormal condition detection signal (too large supply voltage signal) is sent to the microcomputer 31. The microcomputer 31 discontinues the operation of the motor drive circuit 50 (S26, corresponds to a region t2 in FIG. 9B). It is so determined that the supply voltage is too large when the supply voltage VB is included in a region 68 of too large supply voltages.

When it is so determined that the battery voltage becomes smaller than Vth1 again in a state where the booster circuit 22 and the motor drive circuit 50 are not in operation, i.e., in a state where the battery voltage is greater than Vth1 (S27), the booster circuit 22 and the motor drive circuit 50 are operated again (S27→S25→S28, corresponds to a region t3 in FIG. 9B).

Figure 13A:
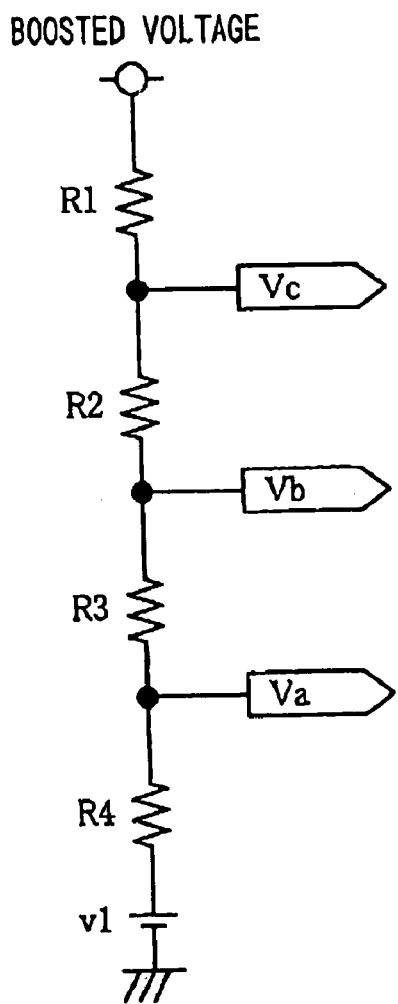
FIGS. 13A–13C are diagrams illustrating how to detect a decrease in the boosted voltage according to the present invention.
Figure 13B:
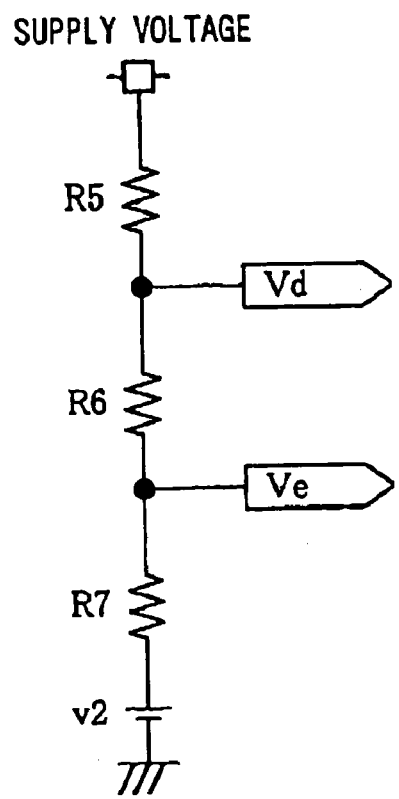
Figure 13C:
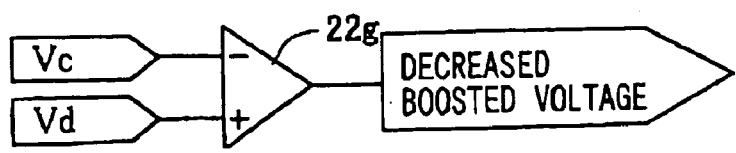

In FIG. 13C, the comparator 22g is a known operational amplifier to which a resistor and a capacitor that are not shown are connected to compare the voltages. To one input terminal of the comparator 22g (voltage monitoring means of the invention), there is input a voltage Vc (see FIG. 13A) divided from the boosted voltage. To the other input terminal thereof, there is input a voltage Vd (see FIG. 13B) which is divided from the supply voltage, Upon comparing these values Vc and Vd, it can be examined if the voltage has been boosted relative to the supply voltage VB. When Vc is smaller than Vd, it is so determined that the voltage has not been properly boosted, and an abnormal condition detection signal (drop-of-boosted-voltage signal) is sent to the microcomputer 31. The microcomputer 31 works to halt the operation of the motor drive circuit 50.

Referring to FIG. 9B, a reference value (Vd) for comparison of the comparator 22g varies in proportion to the supply voltage VB and becomes as represented by a folded line 66. Therefore, a region 67 where the boosted voltage decreases becomes a region where the values are smaller than the folded line 66. Namely, when the boosted voltage lies in the region 67 where the boosted voltage decreases, it is so determined that the boosting operation has not been properly conducted.

In FIGS. 13A–13B, there is no particular limitation on the resistances R1 to R4 for dividing the boosted voltage, on the resistances R5 to R7 for dividing the supply voltage, or on the offset voltages v1 and v2 so far as the voltage Ve can be compared with the threshold value Vth by the comparator 22a and the voltage Vc can be compared with the voltage Vd by the comparator 22g.

(Embodiment 1 of the Invention)

Figure 4:
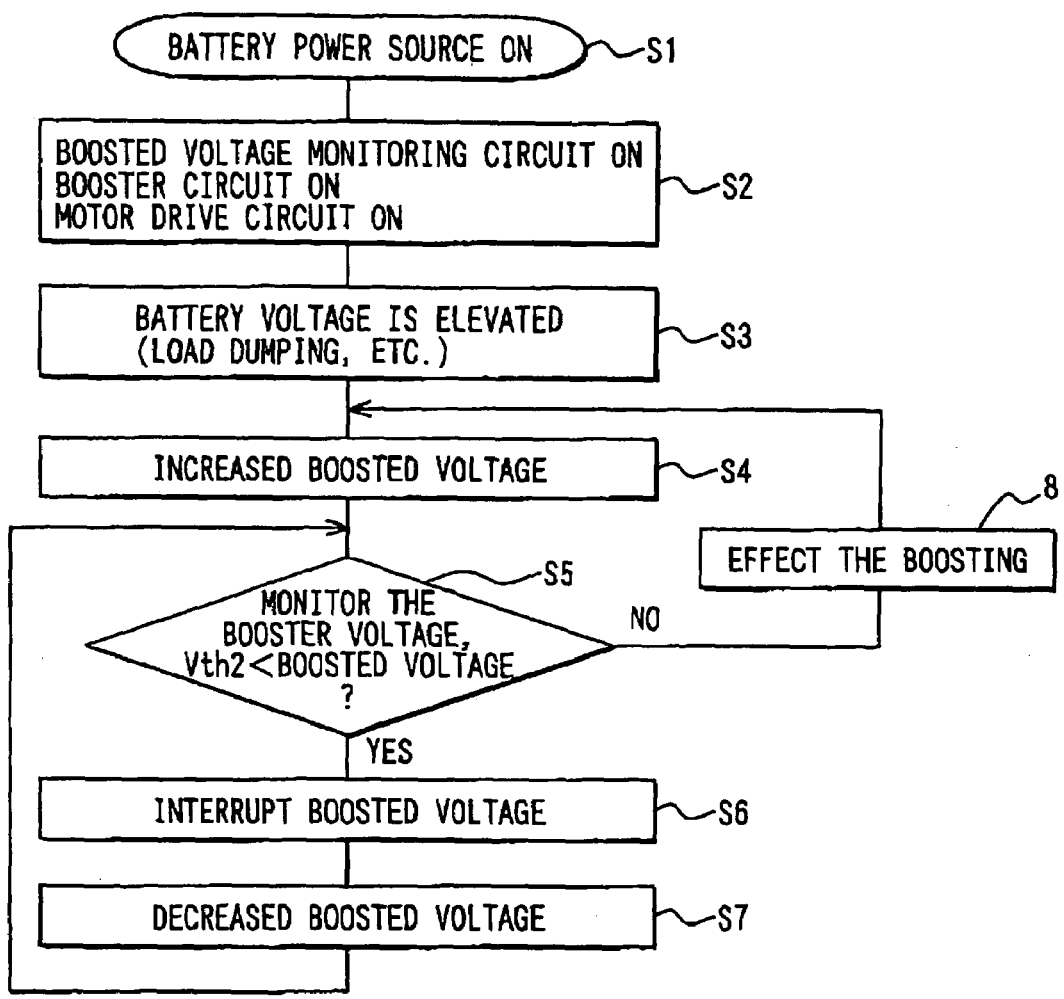
FIG. 4 is a flowchart illustrating the operation of a booster circuit of the invention (embodiments 1 to 3)
Figure 5A:
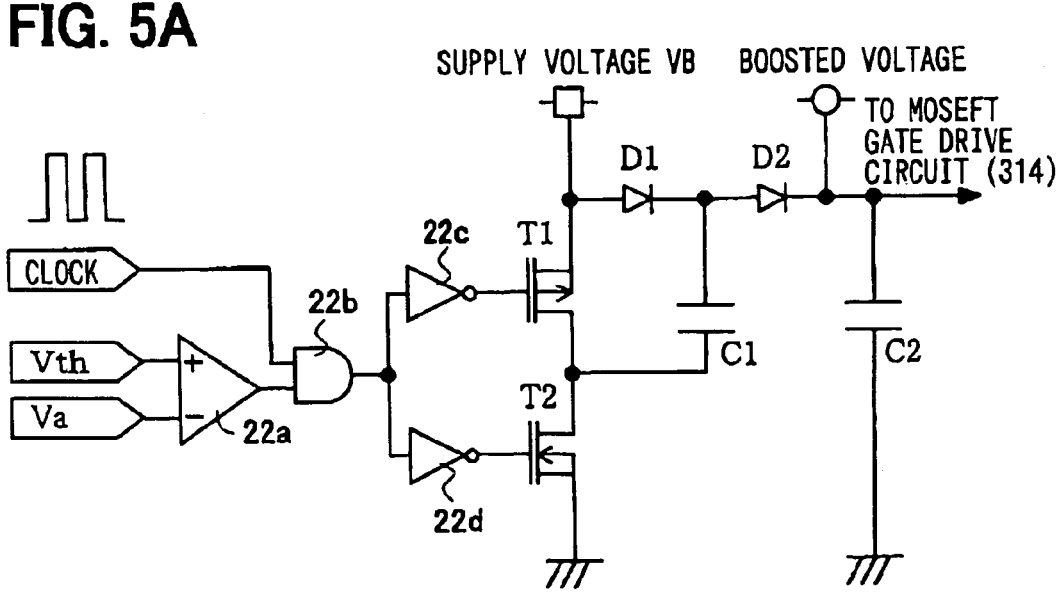
FIGS. 5A–5B are diagrams illustrating the booster circuit of the invention in detail (embodiment 1)
Figure 5B:
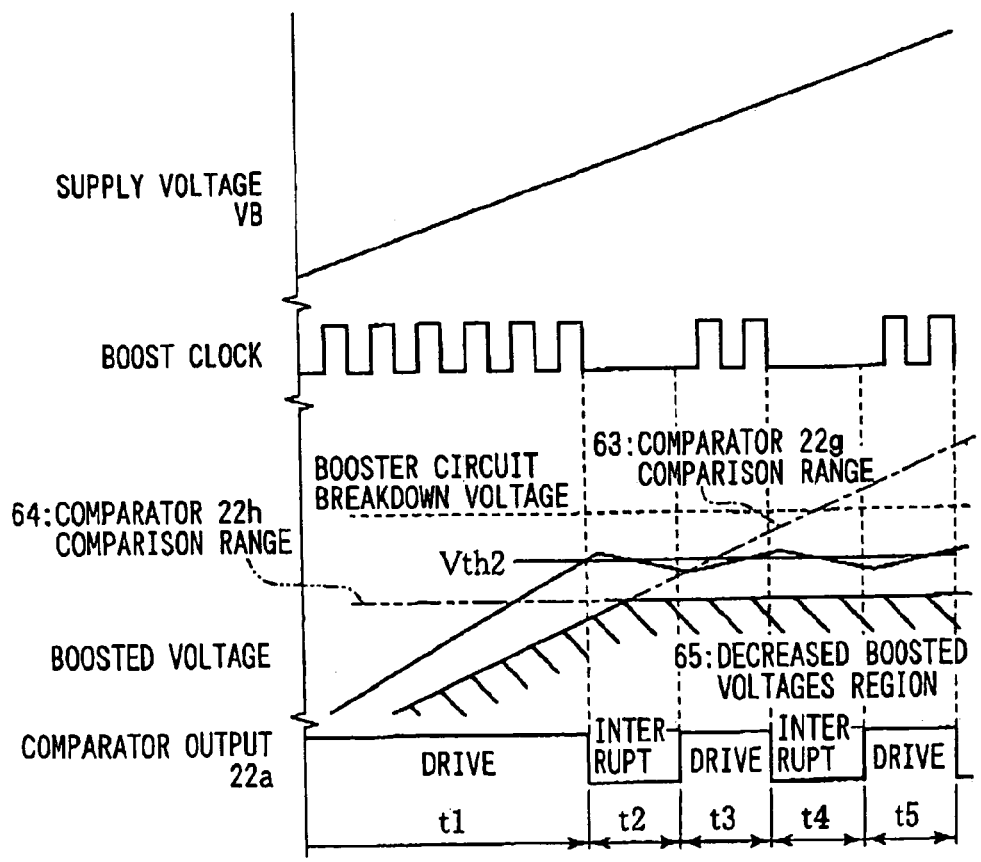

A first embodiment of controlling the booster circuit 22 (booster means of the invention) by the method of the invention will be described with reference to FIGS. 4, 5A and 5B. FIG. 4 is a flowchart illustrating the flow of control operation, and FIGS. 5A–5B are diagrams illustrating the booster circuit and a timing chart of when the booster circuit operates. The diagram of FIG. 5B is a partial modification from the circuit diagram of FIG. 9B, and is, hence, illustrated by using the same reference numerals. Further, the constitution same as that of the prior art is not described here again.

In FIG. 5A, the comparator 22a (voltage monitoring means of the invention) is a known operational amplifier to which a resistor and a capacitor that are not shown are connected to compare the voltages. To one input terminal of the comparator 22a, there is input a voltage Va (see FIG. 12A) divided from the boosted voltage and to the other input terminal thereof, there is input a threshold value Vth for monitoring a high voltage of the boosted voltage. The threshold value Vth may be formed in the booster circuit 22 based on the supply voltage VB of the battery 8, or may be formed by the power supply circuit 35 or by the microcomputer 31.

When the voltage Va divided from the boosted voltage is smaller than the threshold value Vth, the comparator 22a outputs the H-level. When the voltage Va divided from the boosted voltage is larger than the threshold value Vth, the comparator 22a outputs the L-level. The output from the comparator 22a is input to an AND circuit 22b constituted by a known logic circuit to find an AND with the clock signal to turn switching elements T1 and T2 on/off based on the results thereof. Therefore, the clock signal becomes effective only when the comparator 22a is producing the H-level, and the switching elements T1 and T2 are turned on/off. The operations of the switching elements T1 and T2, and the flow of electric charge accumulated in the capacitors C1 and C2 (i.e., constitution of the boosting operation) are the same as those of the constitution of the prior art, and are not described here again.

A flow of the drive control for the booster circuit 22 will be described with reference to the flowchart of FIG. 4. When the relay 33 is turned on to supply the voltage VB from the battery 8 (S1), the booster circuit 22 the boosted voltage monitoring circuit included in the booster circuit 22, the motor drive circuit 50 and the MOSFET gate drive circuit 314 are operated (S2). Thereafter, as described above, an electric charge is accumulated in the capacitor C1 and in the capacitor C2, and the supply voltage VB of the battery 8 is boosted. If the supply voltage VB from the battery 8 rises in this state (S3), the boosted voltage (≈ supply voltage VB of the battery 8×2) output from the booster circuit 22 is further increased (S4, corresponds to a region t1 in FIG. 5B).

The boosted voltage monitoring circuit including the comparator 22a compares the voltage Va divided from the boosted voltage with the threshold value Vth. When it is determined that the boosted voltage is smaller than Vth2 (S5: NO), the booster circuit 22 and the motor drive circuit 50 continue to operate (S8). When it is determined that the boosted Voltage is greater than Vth2 (S5: YES), on the other hand, the comparator 22a produces the L-level to invalidate the clock signal, whereby switching element T1 is turned off and the switching element T2 is turned on to discontinue the operation of the booster circuit 22. However, the motor drive circuit 50 continues to operate (S6, corresponds to a region t2 in FIG. 5B). When it is so determined that the boosted voltage becomes smaller than Vth2 again in a state where the booster circuit 22 is not in operation (S7), the comparator 22a produces the H-level to validate the clock signal whereby the switching elements T1 and T2 are turned on/off. The booster circuit 22 is operated again (S7→S5→S8, corresponds to a region t3 in FIG. 5B). As shown in FIG. 5B, the booster circuit 22 operates (corresponds to a region t5 in FIG. 5B) and stops (corresponds to a region t4 in FIG. 5B) repetitively to continuously produce the boosted voltage as a value close to Vth2.

Figure 12A:
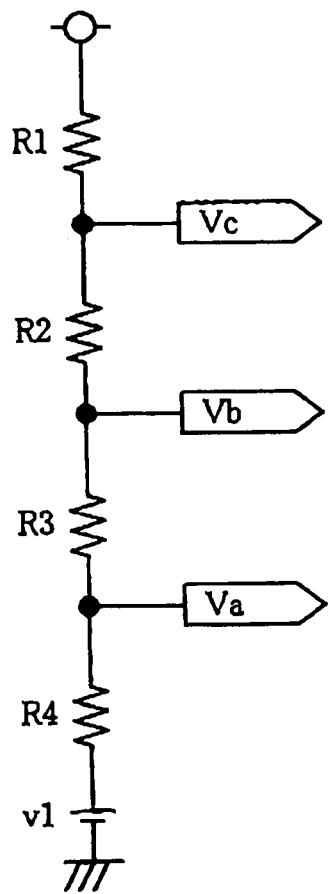
FIGS. 12A–12C are diagrams illustrating how to detect a decrease in the boosted voltage according to the prior art.
Figure 12B:
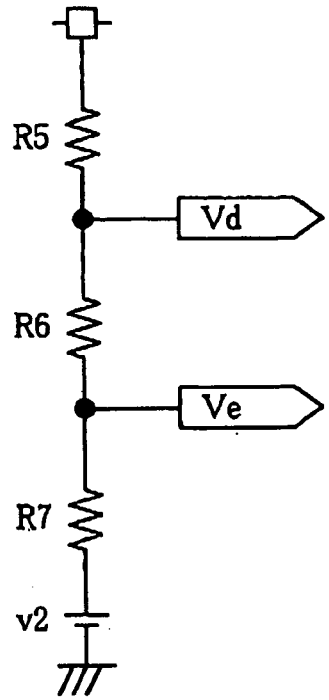
Figure 12C:
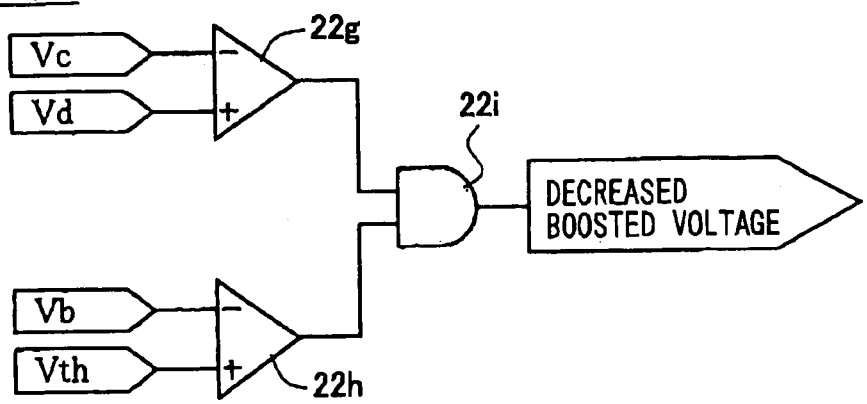

In FIG. 12C, the comparator 22g and the comparator 22h (voltage monitoring means of the invention) are known operational amplifiers to which resistors and capacitors that are not shown are connected to compare the voltages. To one input terminal of the comparator 22g, there is input a voltage Vc (see FIG. 12A) divided from the boosted voltage. To the other input terminal thereof, there is input a voltage Vd (see FIG. 12B) divided from the applied voltage VB. Further, to one input terminal of the comparator 22h, there is input a voltage Vb (see FIG. 12A) divided from the boosted voltage. To the other input terminal thereof, there is input a threshold value Vth for monitoring a low voltage of the boosted voltage. The outputs of the comparators 22g and 22h are input to an AND circuit 22i including a known AND element.

Upon comparing the above values, it can be examined if the voltage has been properly boosted. When Vb is smaller than the threshold value Vth and Vc is smaller than Vd, it is so determined that the voltage has not been properly boosted, and an abnormal condition detection signal (drop-of-boosted-voltage signal) is sent to the microcomputer 31. The microcomputer 31 works to halt the operation of the motor drive circuit 50.

Referring to FIG. 5B, a reference value (Vd) for comparison of the comparator 22g varies in proportion to the supply voltage VB and becomes as represented by a straight line 63. On the other hand, the reference value (Vth) for comparison of the comparator 22h assumes a constant value and becomes as represented by a straight line 64. Therefore, a region 65 where the boosted voltage decreases becomes a region where the boosted voltages are smaller than the values of the straight lines 63 and 64. Namely, when the boosted voltage lies in the region 65 where the boosted voltage decreases, it is so determined that the boosting operation has not been properly conducted.

In FIGS. 12A–12C, there is no particular limitation on the resistances R1 to R4 for dividing the boosted voltage, on the resistances R5 to R7 for dividing the supply voltage VB, or on the offset voltages v1 and v2 so far as the voltage Va can be compared with the threshold value Vth by the comparator 22a, the voltage Vc can be compared with the voltage Vd by the comparator 22g, and the voltage Vb can be compared with the threshold value Vth by the comparator 22h.

(Embodiment 2 of the Invention)

Figure 6:
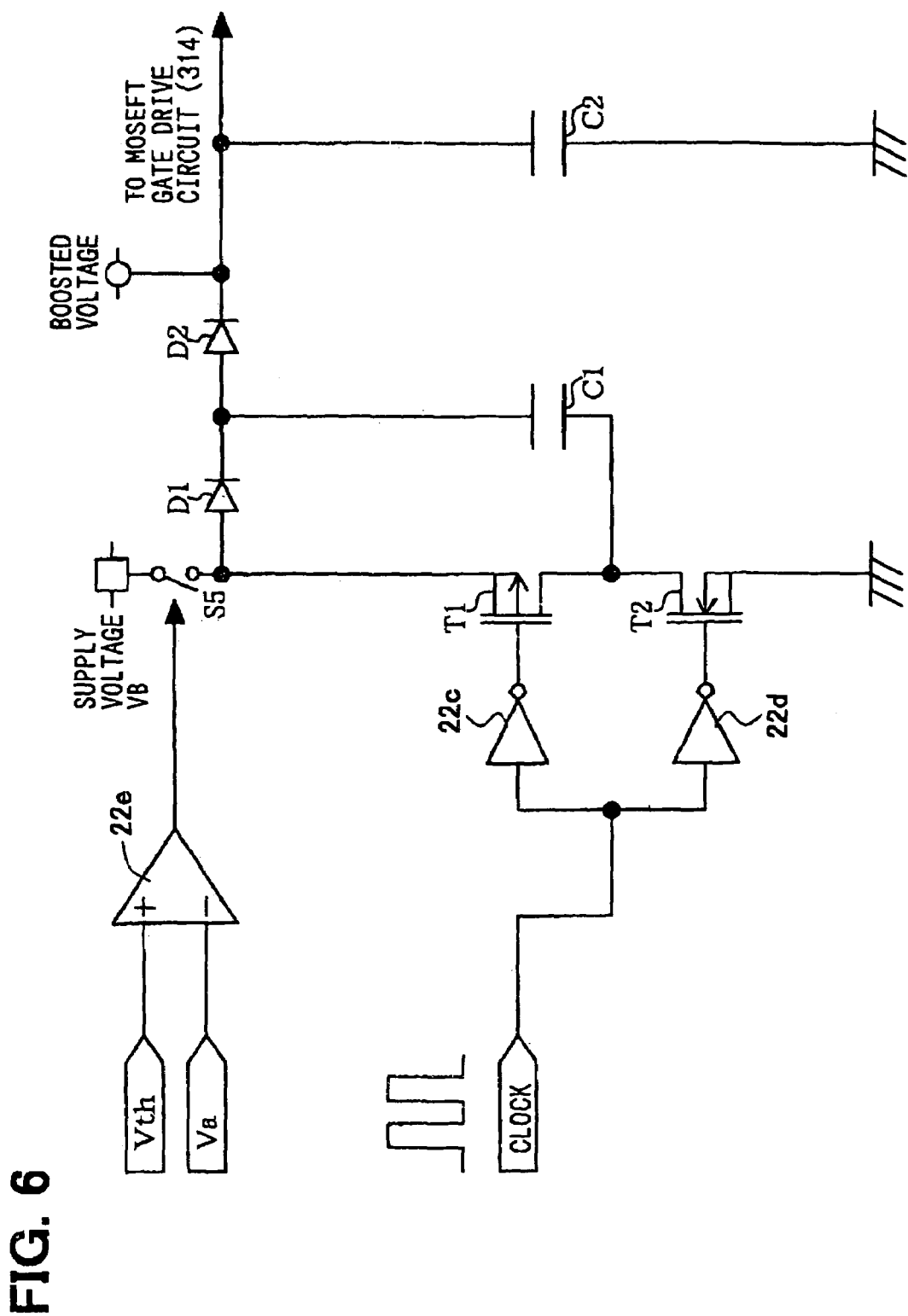
FIG. 6 is a diagram illustrating the booster circuit of the invention in detail (embodiment 2)

A second embodiment of controlling the booster circuit 22 (booster means of the invention) by the method of the invention will be described with reference to FIG. 6. FIG. 6 is a partial modification from the circuit diagram of FIG. 5, and is, hence, illustrated by using the same reference numerals. The portions overlapping those of the embodiment 1 of the invention are not described here again.

In FIG. 6, the comparator 22e (voltage monitoring means of the invention) is a known operational amplifier to which a resistor and a capacitor that are not shown are connected to compare the voltages. To one input terminal of the comparator 22e, there is input a voltage Va (see FIG. 12A) divided from the boosted voltage and to the other input terminal thereof, there is input a threshold value Vth for monitoring a high voltage of the boosted voltage. The threshold value Vth may be formed in the boosting circuit 22 based on the supply voltage VB of the battery 8, or may be formed by the power supply circuit 35 or by the microcomputer 31.

When the voltage Va divided from the boosted voltage is smaller than the threshold value Vth, the comparator 22e outputs the H-level. When the voltage Va divided from the boosted voltage is larger than the threshold value Vth, the comparator 22e outputs the L-level. The output from the comparator 22e is input to a known semiconductor switch or to a switching circuit S5 constituted by a relay circuit or the like. The switching circuit S5 is turned on by the output of the H-level of the comparator 22e and is turned off by the output of the L-level.

The constitution in which the electric charge is accumulated in the capacitor C1 and in the capacitor C2 by the turn on/off operation of the switching element T1 and of the switching element T2, is the same as that of the embodiment 1 of the embodiment, and is not described here again.

A flow of the drive control for the booster circuit 22 will be described with reference to the flowchart of FIG. 4. When the relay 33 is turned on to supply the voltage VB from the battery 8 (S1), the boosted voltage monitoring circuit included in the booster circuit 22, the booster circuit 22, the motor drive circuit 50 and the MOSFET gate drive circuit 314 are operated (S2). Here, the switching circuit S5 is turned on. Thereafter, as described above, an electric charge is accumulated in the capacitor C1 and in the capacitor C2, and the voltage of the battery 8 is boosted. If the supply voltage VB from the battery 8 is boosted in this state (S3) the boosted voltage (≈supply voltage VB of the battery 8×2) output from the booster circuit 22 is further increased (S4, corresponds to a region t1 in FIG. 5B).

The boosted voltage monitoring circuit including the comparator 22e compares the voltage Va divided from the boosted voltage with the threshold value Vth. When it is determined that the boosted voltage is smaller than Vth2 (S5: NO), the comparator 22e produces the H-level to turn the switching circuit S5 on, and the booster circuit 22 and the motor drive circuit 50 continue to operate (S8). When it is determined that the boosted voltage is greater than Vth2 (S5: YES), on the other hand, the comparator 22e produces the L-level to turn the switching circuit S5 off thereby to interrupt the supply of electric power from the battery 8.

Therefore, even when the switching element T1 is turned off and the switching element T2 is turned on, there is not established the passage of battery 8 (supply voltage VB)—diode D1—capacitor C1—switching element T2—GND (ground), and no electric charge is accumulated in the capacitor C1. There is not established, either, the passage of battery 8 (supply voltage VB)—switching element T1—capacitor C1—diode D2, and the electric charge accumulated in the capacitor C1 is not accumulated in the capacitor C2. When the switching circuit S5 is turned off, the booster circuit 22 ceases to operate. However, the motor drive circuit 50 continues to operate (S6, corresponds to a region t2 in FIG. 5B).

When it is so determined that the boosted voltage becomes smaller than Vth2 again in a state where the booster circuit 22 is not in operation (S7), the comparator 22e produces the H-level to turn the switching circuit S5 on whereby the electric power is supplied again from the battery 8 and the booster circuit 22 is operated again (S7→S5→S8, corresponds to a region t3 in FIG. 5B). As shown in FIG. 5B, the electric power is supplied from the battery 8 (corresponds to a region t5 in FIG. 5B) and is interrupted (corresponds to a region t4 in FIG. 5B) repetitively to continuously produce the boosted voltage as a value close to Vth2.

The method of determining whether the voltage has been boosted to a degree that is necessary and sufficient is the same as the one described in the embodiment 1 of the invention with reference to FIGS. 5B and 12, and is not described here again in detail.

(Embodiment 3 of the Invention)

Figure 7:
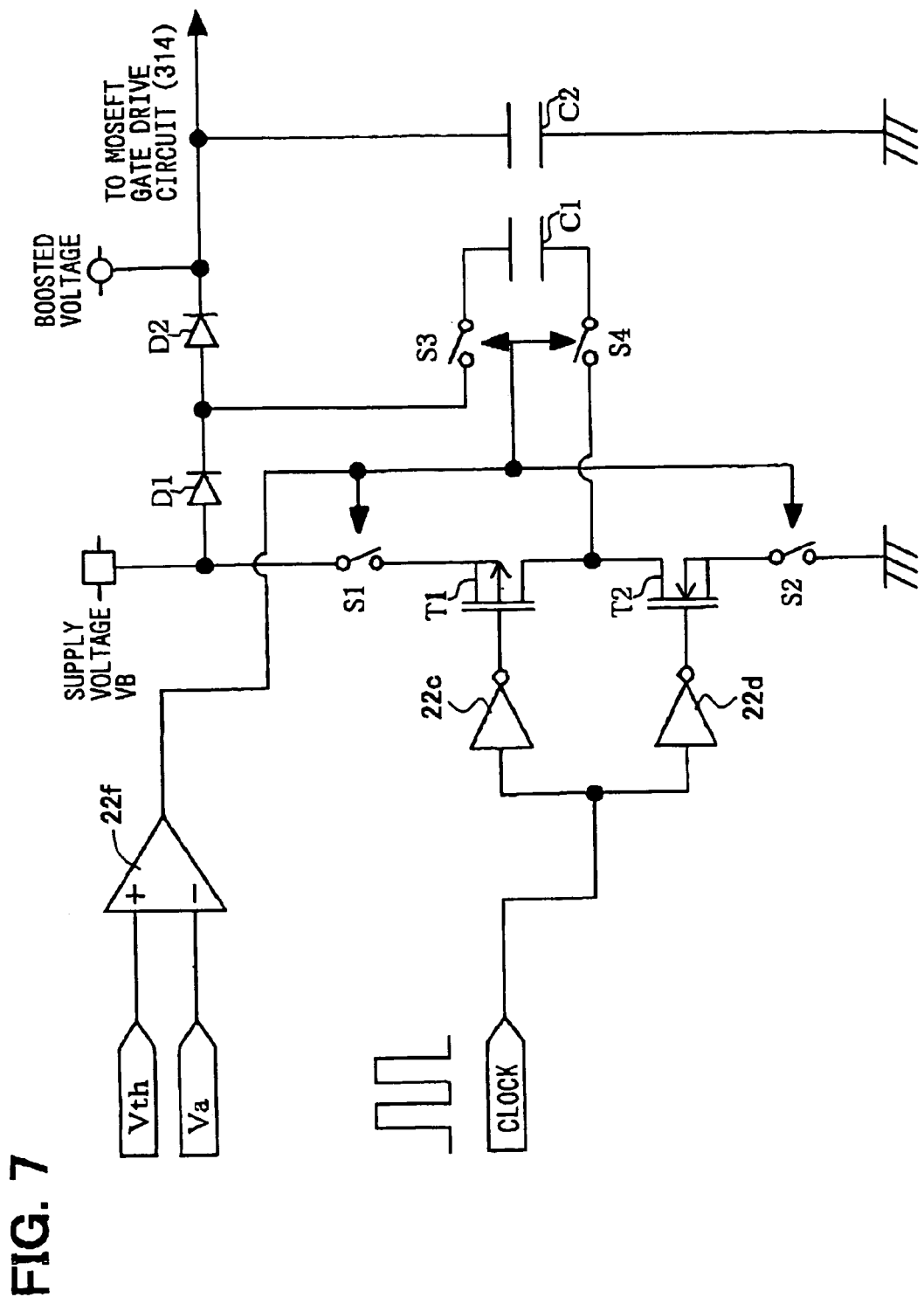
FIG. 7 is a diagram illustrating the booster circuit of the invention in detail (embodiment 3)

A third embodiment of controlling the booster circuit 22 (booster means of the invention) by the method of the invention will be described with reference to FIG. 7. FIG. 7 is a partial modification from the circuit diagram of FIGS. 5A–5B, and is, hence, illustrated by using the same reference numerals. The portions overlapping those of the embodiment 1 of the invention are not described here again.

In FIG. 7, the comparator 22f (voltage monitoring means of the invention) is a known operational amplifier to which a resistor and a capacitor that are not shown are connected to compare the voltages. To one input terminal of the comparator 22f, there is input a voltage Va (see FIG. 12A) divided from the boosted voltage and to the other input terminal thereof, there is input a threshold value Vth for monitoring a high voltage of the boosted voltage. The threshold value Vth may be formed in the booster circuit 22 based on the supply voltage VB of the battery 8, or may be formed by the power supply circuit 35 or by the microcomputer 31.

When the voltage Va divided from the boosted voltage is smaller than the threshold value Vth, the comparator 22f outputs the H-level. When the voltage Va divided from the boosted voltage is larger than the threshold value Vth, the comparator 22f outputs the L-level. The output from the comparator 22f is input to known semiconductor switches or switching circuits S1, S2, S3 and S4 constituted by relay circuits or the like. These four switching circuits are turned on by the output of the H-level of the comparator 22f and are turned off by the output of the L-level.

The constitution in which the electric charge is accumulated in the capacitor C1 and in the capacitor C2 by the turn on/off operation of the switching element T1 and of the switching element T2, is the same as that of the embodiment 1 of the embodiment, and is not described here again.

A flow of the drive control for the booster circuit 22 will be described with reference to the flowchart of FIG. 4. When the relay 33 is turned on to supply the voltage VB from the battery 8 (S1), the booster circuit 22, the boosted voltage monitoring circuit included in the booster circuit 22, the motor drive circuit 50 and the MOSFET gate drive circuit 314 are operated (S2). Here, the switching circuits S1, S2, S3 and 54 are turned on. Thereafter, as described above, an electric charge is accumulated in the capacitor C1 and in the capacitor C2, and the voltage of the battery 8 is boosted. If the supply voltage VB from the battery 8 is boosted in this state (S3), the boosted voltage (≈supply voltage VB of the battery 8×2) output from the booster circuit 22 is further increased (S4, corresponds to a region t1 in FIG. 5B).

The boosted voltage monitoring circuit including the comparator 22f compares the voltage Va divided from the boosted voltage with the threshold value Vth. When it is determined, that the boosted voltage is smaller than Vth2 (S5: NO), the booster circuit 22 and the motor drive circuit 50 continue to operate (S8). When it is determined that the boosted voltage is greater than Vth2 (S5: YES), on the other hand, the comparator 22f produces the L-level to turn the switching circuits S1, S2, S3 and S4 off. Therefore, no passage is formed for accumulating the electric charge in the capacitor C1, and no electric charge is accumulated in the capacitor C1. There is not established, either, the passage from the capacitor C1 to the capacitor C2, and the voltage is not boosted. However, the motor drive circuit 50 continues to operate (S6, corresponds to a region t2 in FIG. 5B).

When it is so determined that the boosted voltage becomes smaller than Vth2 again in a state where the booster circuit 22 is not in operation (S7), the comparator 22f produces the H-level to turn the switching circuits S1, 52, S3 and S4 on whereby the booster circuit 22 is operated again (S7→S5→S8, corresponds to a region t3 in FIG. 5B). As shown in FIG. 5B, the electric power is supplied from the battery 8 (corresponds to a region t5 in FIG. 5B) and is interrupted (corresponds to a region t4 in FIG. 5B) repetitively to continuously produce the boosted voltage as a value close to Vth2.

In the circuit diagram of FIG. 7, it is allowable to employ any one of the constitution having switching circuits S1 and S2 only, the constitution having switching circuits S3 and S4 only, or the constitution having any one of S1 to S4.

Further, the method of determining whether the voltage has been boosted to a degree that is necessary and sufficient is the same as the one described in the embodiment 1 of the invention with reference to FIGS. 5B and 12, and is not described here again in detail.

(Application to the Electric Power-Assisted Steering Device)

Figure 11:
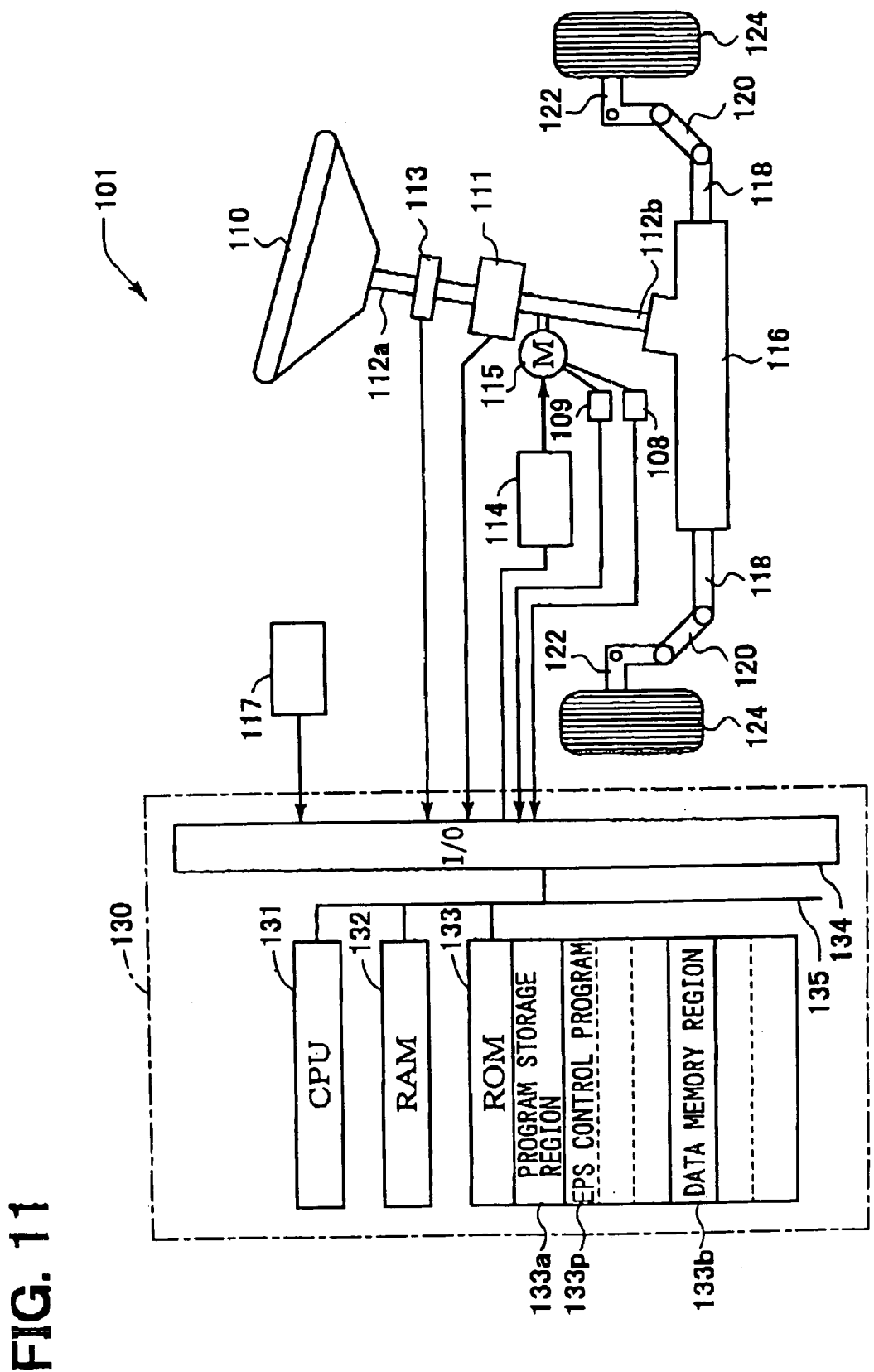
FIG. 11 is a diagram illustrating the whole constitution of an electric power-assisted steering device.

The rotation detecting device of the invention can be preferably applied to the electric power-assisted steering (EPS) device for a vehicle. FIG. 11 is a diagram schematically illustrating the constitution of an electric power-assisted steering device 101. A steering wheel 110 is connected to a steering shaft 112a which is connected at its lower end to a torque sensor 111 that detects the motion of the steering wheel 110. An upper end of a pinion shaft 112b is connected to the torque sensor 111. Further, a pinion (not shown) is provided at the lower end of the pinion shaft 112b, and is brought into mesh with a rack bar 118 in a steering gear box 116. Further, the ends on one side of tie rods 120 are connected to both ends of the rack bar 118, and rolling wheels 124 to be steered are connected to the ends on the other side of the tie rods 120 via knuckle arms 122. Further, a motor 115 is attached to the pinion shaft 112b via a gear (not shown). The motor 115 may be mounted in concentric with the rack bar 118.

A steering control unit 130 includes a CPU 131, a RAM 132, a ROM 133, an I/O 134 which is an input/output interface, and a bus line 135 for connecting them, which have been known. The CPU 131 executes the control operation relying upon the program and data stored in the ROM 133 and the RAM 132. The ROM 133 includes a program storage region 133a and a data memory region 133b. The program storage region 133a stores an EPS control program 133p. The data storing region 133b stores the data necessary for operating the EPS control program 133p.

In the steering control unit 130, the CPU 131 executes the EPS control program stored in the ROM 133 to calculate a drive torque to be produced by the motor 115, that corresponds to a torque detected by the torque sensor 111 and to a steering angle detected by the steering angle sensor 113. A voltage is applied to the motor 115 via the motor drive circuit 114 to produce the drive torque as calculated.

The steering control unit 130 and the motor drive circuit 114 in the electric power-assisted steering device 101 is constituted in nearly the same manner as those of the transmission ratio-variable control unit 1 of FIG. 1. Therefore, the electronic control unit of the invention can be applied thereto.

In the foregoing were described the embodiments of the invention, which, however, are merely examples and to which only the invention is in no way limited. The invention can be further modified in a variety of ways based on the knowledge of a person skilled in the art without departing from the spirit and scope of the invention.

What is claimed is:

1. An electronic control unit comprising:
   an inverter that drives switching elements and converts a DC voltage into an AC voltage;
   booster means which boosts a DC voltage that is input into a voltage to lie within a voltage range in which a voltage necessary for driving the switching elements is a lower-limit value and a maximum boosted voltage is an upper-limit value, and outputs the boosted voltage to the inverter;
   voltage monitoring means for monitoring a voltage value that is boosted,
   wherein the booster means discontinues the boosting when the monitored voltage becomes greater than a predetermined threshold value include in the voltage range, and effects the boosting when the monitored voltage becomes smaller than the threshold value; and
   wherein the booster means continues a voltage output to the inverter while intermitting the boosting.

2. An electric power-assisted steering device according to claim 1, wherein the electronic control unit is an electric power-assisted steering device in a vehicle in which a motor is energized and driven based on the steering operation by a driver to give a steer-assisting torque to a steering mechanism, wherein the motor is driven by the inverter.

3. A transmission ratio-variable steering unit according to claim 1, wherein the electronic control unit is a transmission ratio-variable steering unit comprising an input shaft connected to the steering side, an output shaft connected to the side of the rolling wheels to be steered, and a transmission ratio-variable mechanical unit which varies the rotational angle of the output shaft relative to the rotational angel of the input shaft by energizing and driving a motor, wherein the motor is driven by the inverter.

4. An electronic control unit comprising:
   an inverter that drives a driven member and converts a DC voltage into an AC voltage;
   a booster circuit which boosts an input DC voltage to be a value in a voltage range between a lower limit value necessary for driving the driven member and an upper limit value that is a maximum boosted voltage; and
   a voltage monitoring circuit which monitors a boosted voltage in the booster circuit, wherein:
   the booster circuit discontinues the boosting and continues a voltage output to the inverter when the monitored voltage becomes greater than a predetermined threshold value include in the voltage range; and
   the booster circuit performs the boosting and continues a voltage output to the inverter when the monitored voltage becomes smaller than the threshold value in the voltage range.

5. An electronic control unit comprising:
   an inverter that drives switching elements and converts a DC voltage into an AC voltage;
   a motor drive circuit which provides a DC voltage necessary for driving the switching elements;
   a booster circuit which boosts the DC voltage and outputs the boosted voltage to the inverter;
   a voltage monitor monitoring the boosted voltage,
   wherein the booster circuit discontinues boosting when the monitored voltage becomes greater than a given threshold value include in a desired voltage range, and continues boosting when the monitored voltage becomes less than the given threshold value include in the desired voltage range.

6. An electric power-assisted steering device according to claim 5, wherein the electronic control unit is an electric power-assisted steering device in a vehicle in which a motor is energized and driven based on the steering operation by a driver to give a steer-assisting torque to a steering mechanism, wherein the motor is driven by the inverter.

7. A transmission ratio-variable steering unit according to claim 5, wherein the electronic control unit is a transmission ratio-variable steering unit comprising an input shaft connected to the steering side, an output shaft connected to the side of the rolling wheels to be steered, and a transmission ratio-variable mechanical unit which varies the rotational angle of the output shaft relative to the rotational angle of the input shaft by energizing and driving a motor, wherein the motor is driven by the inverter.

* * * * *